United States Patent
Park

(10) Patent No.: US 7,136,668 B1
(45) Date of Patent: Nov. 14, 2006

(54) METHOD FOR ADJUSTING THE VOLUME OF COMMUNICATION VOICE AND KEY TONE IN A CELLULAR PHONE

(75) Inventor: Seok-Hyo Park, Kumi-shi (KR)

(73) Assignee: Samsung Electronics Co., Ltd. (KR)

( * ) Notice: Subject to any disclaimer, the term of this patent is extended or adjusted under 35 U.S.C. 154(b) by 397 days.

(21) Appl. No.: 09/626,824

(22) Filed: Jul. 27, 2000

(30) Foreign Application Priority Data

Jul. 27, 1999 (KR) ............................... 1999-30680

(51) Int. Cl.
*H04M 1/00* (2006.01)
(52) U.S. Cl. ............................... 455/550.1; 455/414.1; 455/563
(58) Field of Classification Search ............. 455/550.1, 455/575.1, 566, 568, 414.1, 563, 569, 140, 455/79, 550, 575, 414
See application file for complete search history.

(56) References Cited

U.S. PATENT DOCUMENTS

| | | | |
|---|---|---|---|
| 4,945,570 A * | 7/1990 | Gerson et al. ............... 455/563 |
| 4,959,850 A * | 9/1990 | Marui ........................ 455/563 |
| 4,991,484 A * | 2/1991 | Kawashima ................. 84/603 |
| 5,042,063 A * | 8/1991 | Sakanishi et al. ........ 379/88.03 |
| 5,201,068 A * | 4/1993 | Kawashima ............. 455/550.1 |
| 5,239,586 A * | 8/1993 | Marui ........................ 704/270 |
| 5,247,705 A * | 9/1993 | Attig et al. .................... 455/74 |
| 5,267,323 A * | 11/1993 | Kimura ...................... 381/110 |
| 5,335,313 A * | 8/1994 | Douglas ..................... 704/275 |
| 5,420,860 A * | 5/1995 | Stevens et al. ............. 370/263 |
| 5,479,490 A * | 12/1995 | Nakashima .................. 379/74 |
| 5,506,578 A * | 4/1996 | Kishi et al. .................. 340/996 |
| 5,659,597 A * | 8/1997 | Bareis et al. ................ 455/563 |
| 5,805,672 A * | 9/1998 | Barkat et al. ............. 379/88.03 |
| 5,898,933 A * | 4/1999 | Kaschke ................... 455/575.7 |
| 5,978,689 A * | 11/1999 | Tuoriniemi et al. ......... 455/569 |
| 6,198,947 B1 * | 3/2001 | Barber ....................... 455/563 |
| 6,212,408 B1 * | 4/2001 | Son et al. ................... 455/563 |
| 6,226,532 B1 * | 5/2001 | Kim et al. .................. 455/563 |
| 6,236,867 B1 * | 5/2001 | Todo et al. ................. 455/563 |
| 6,263,218 B1 * | 7/2001 | Kita ........................... 455/567 |
| 6,339,706 B1 * | 1/2002 | Tillgren et al. ............. 455/419 |
| 6,366,649 B1 * | 4/2002 | Chun et al. .............. 379/88.01 |
| 6,393,304 B1 * | 5/2002 | Meche ........................ 455/563 |
| 6,418,328 B1 * | 7/2002 | Shon .......................... 455/563 |
| 6,473,628 B1 * | 10/2002 | Kuno et al. ................. 455/566 |
| 6,636,609 B1 * | 10/2003 | Ha et al. ..................... 381/104 |

* cited by examiner

*Primary Examiner*—Matthew D. Anderson
*Assistant Examiner*—Tan Trinh
(74) *Attorney, Agent, or Firm*—Dilworth & Barrese LLP

(57) ABSTRACT

A method for adjusting the volume level of communication voice and key tones in a cellular phone, comprising the steps of inputting a first and a second voice command for commanding the cellular phone to raise the volume level or lower it, determining whether the cellular phone is in an "on" communication state when the first or second voice command is inputted to the cellular phone, raising or lowering the volume level respectively in response to the first or second voice command if the cellular phone is in an "on" communication state determining whether the cellular phone is in a key tone adjustment mode if the cellular phone is not in an "on" communication state when the first or second voice command is inputted to the cellular phone, and raising or lowering the volume level of the key tone respectively in response to the first or second voice command if the cellular phone is in the key tone adjustment mode.

2 Claims, 3 Drawing Sheets

METHOD FOR ADJUSTING THE VOLUME OF COMMUNICATION VOICE AND KEY TONE IN A CELLULAR PHONE

BACKGROUND OF THE INVENTION

1. Field of the Invention

The present invention relates to a cellular phone, and more particularly to a method for adjusting the volume of communication voice and key tones in a cellular phone.

2. Description of the Related Art

In general, a cellular phone is provided with a device for adjusting the volume of communication voice and key tones in which the user adjusts the volume of the speaker by manually actuating two volume-adjustment buttons. Typically, the volume adjustment buttons are installed on one side of the cellular phone. However, such conventional volume-adjustment buttons are inconvenient for the user to operate when one hand is holding the phone during communication. In addition, these volume-adjustment buttons serve as a limitation in designing a compact cellular phone.

SUMMARY OF THE INVENTION

It is an object of the present invention to provide a method for adjusting the volume of communication voice and key tones in a cellular phone which eliminates the two conventional volume-adjustment buttons from the cellular phone, and is convenient for the user to adjust the volume.

It is another object of the present invention to provide a method for adjusting the volume level of communication voice and key tones by means of voice commands registered in a cellular phone.

According to an embodiment of the present invention, there is provided a method for adjusting the volume level of communication voice and key tone in a cellular phone that comprises the steps of registering a first voice command for commanding the cellular phone to raise the volume level, and registering a second voice command to lower it; determining whether the cellular phone is in an "on" state or an "off" state to receive communication when the first or second voice command is inputted to the cellular phone; raising or lowering the volume level respectively in response to the first or second voice command if the cellular phone is in an "on" state to receive communication; determining whether the cellular phone is in a key tone adjustment mode if the cellular phone is not in an "on" state to receive communication when the first or second voice command is inputted to the cellular phone; and raising or lowering the volume level of the key tones respectively in response to the first or second voice command if the cellular phone is in the key tone adjustment mode.

The present invention will now be described more specifically with reference to the drawings attached only by way of example.

BRIEF DESCRIPTION OF THE FIGURES

The above and other objects features and advantages of the present invention will become more apparent from the following detailed description when taken in conjunction with the accompanying drawings in which.

DETAILED DESCRIPTION OF THE PREFERRED EMBODIMENT

Preferred embodiments of the present invention will be described hereinbelow with reference to the accompanying drawings. In the following description, well-known functions or constructions are not described in detail since they would obscure the invention in unnecessary detail.

Figure 1:
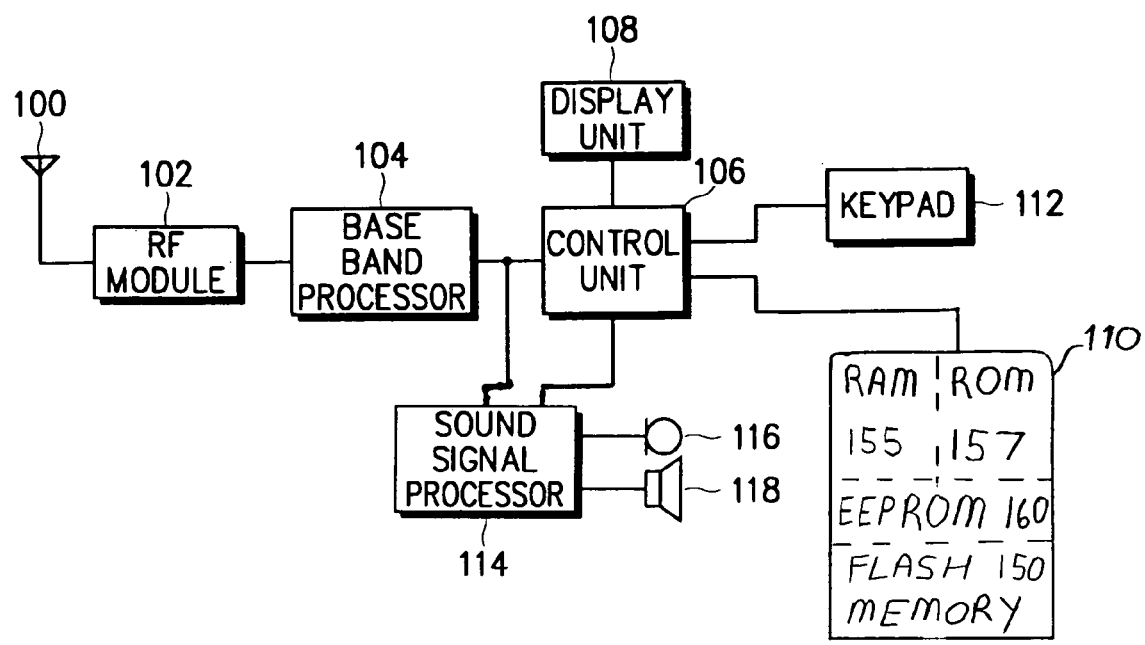
FIG. 1 is a block diagram illustrating the structure of a cellular phone embodying the present invention.

Referring to FIG. 1, when receiving an RF signal, an RF (Radio Frequency) module 102 demodulates an RF signal received from a base station through an antenna 100, and transfers the RF signal to a base band processor 104. The base band processor 104 down converts the output signal of the RF module 102 into a digital signal and applies the digital signal to a control unit 106. When transmitting the RF signal, RF module 102 modulates a signal from the base band processor 104, and transmits the RF signal through antenna 100 to a base station. The base band processor 104 up converts the signal from the control unit 106 into an analog signal and transfers an analog signal to the RF module 102. The control unit 106 is a central processing unit such as a mobile system microprocessor (MSM) found in mobile telephones, and controls the entire operation of the cellular phone.

A memory device 110 includes a flash memory 150 for storing the control program of the control unit 106, an Electrically Erasable and Programmable Read-Only Memory (EEPROM) 160 for storing various setting data such as power level, etc. The memory device 110 further includes a static RAM 155 for storing various flag data and call treatment information and a Read-Only Memory (ROM) 157. ROM 157 typically has a memory size of either 16 or 32 megabytes, while RAM 155 typically has a memory size of less than or equal to 4 megabytes. The memory device 110 also allocates the memory regions for storing the voice commands to adjust the volume level of the cellular. A keypad 112 includes a plurality of keys for entering various commands and information. A display unit 108 usually consists of an LCD module to display the information under the control of control unit 106. A sound signal processor 114 processes audio data received from base band processor 104, converts the audio data into audio signals and delivers the audio signals to a speaker 118. The sound signal processor 114 also processes audio signals received through a microphone 116, and converts the signals into audio data and delivers the signals to the base band processor 104 or control unit 106. The control unit 106 stores the audio data corresponding to the user's voice inputted through the microphone 116 into memory device 110 when in a mode of registering the voice commands to adjust the volume.

Figure 2:
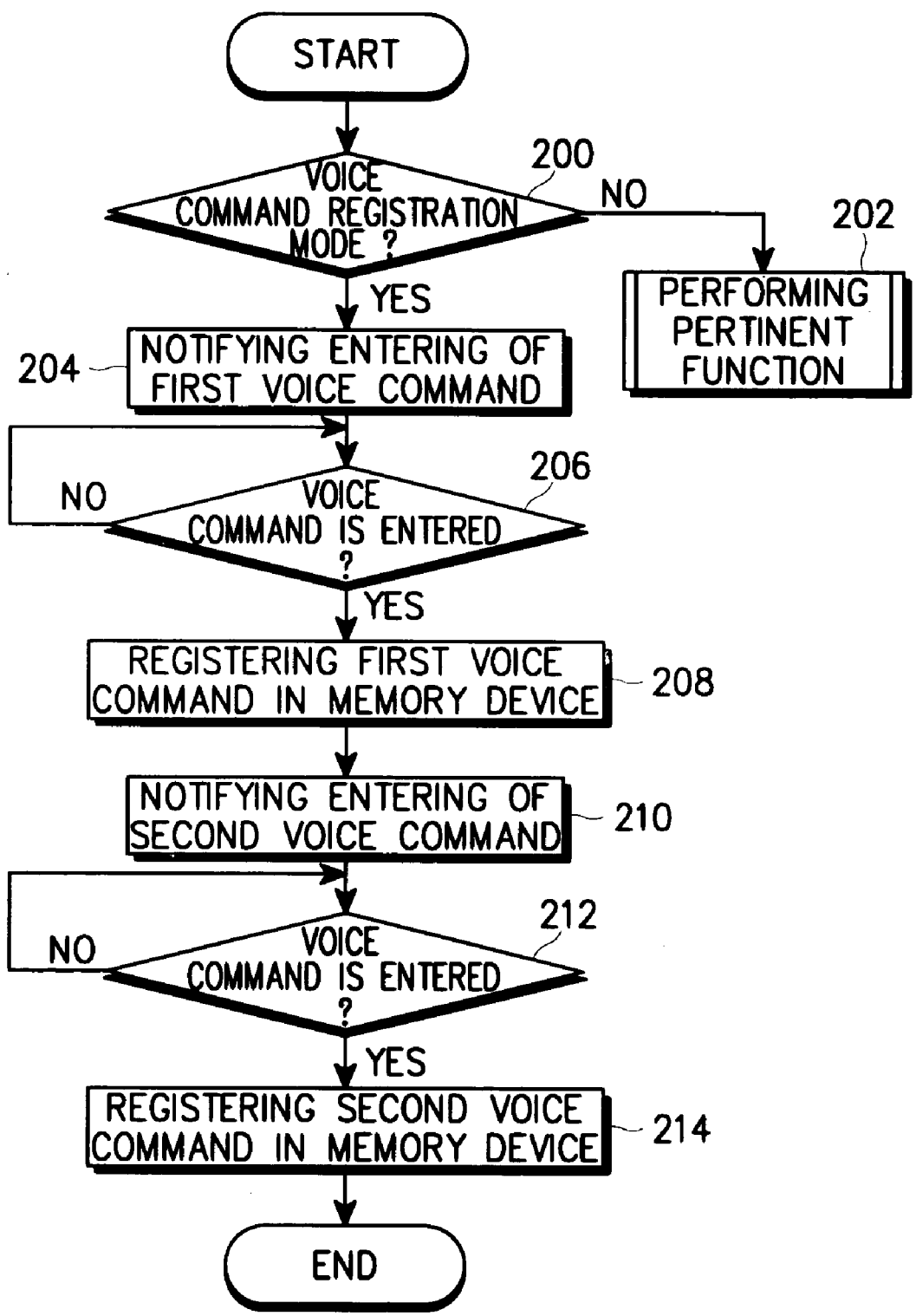
FIG. 2 is a flow chart illustrating the process of registering a first and a second voice command respectively used for commanding the cellular phone to raise and lower the volume level of voice communication and key tones according to the present invention.

Referring to FIG. 2, the process of registering the voice commands used for adjusting the volume level of voice communication and key tone in the cellular phone is described. The control unit 106 determines at decision step 200 whether the user enters the voice command registration mode by operating the keypad 112. If the cellular phone is in the voice command registration mode, the control unit 106 proceeds to step 204 to notify the user to enter a first voice command to be used for raising the volume level of the cellular phone through the display unit 108 or speaker 118. In this case, the notification may be made through display unit 108 and/or speaker 118. If the cell phone is not in voice command registration mode, the process proceeds to step 202 to perform pertinent functions. The pertinent functions refer to manually adjusting the volume of communication voice and key tone of the cellular phone by using the key pad. At step 206, the control unit 106 determines whether the user enters the first voice command through the microphone 116. If so, the control unit 106 registers the first voice command in the memory device 110 in step 208. Thereafter, the control unit 106 proceeds to step 210 to notify the user to enter a second voice command to be used for lowering the volume level of the cellular phone through the display unit 108 and/or speaker 118. Then, the control unit 106 determines, at decision 212, whether the user entered the second voice command through the microphone 116. If so, the control unit 106 registers the second voice command in the memory device 110 in step 214. If not, the control unit 106 continues to determine whether a voice command in inputted once the command is displayed on the LCD.

Additionally, the above process may include further steps of confirming the entered voice commands. For example, after entering the first voice command, the control unit requests the user to re-enter it in order to confirm that the first entered voice command should be registered. Namely, the voice command is registered or not depending on whether first entered voice command agrees with the second entered (re-entered) voice command.

Figure 3:
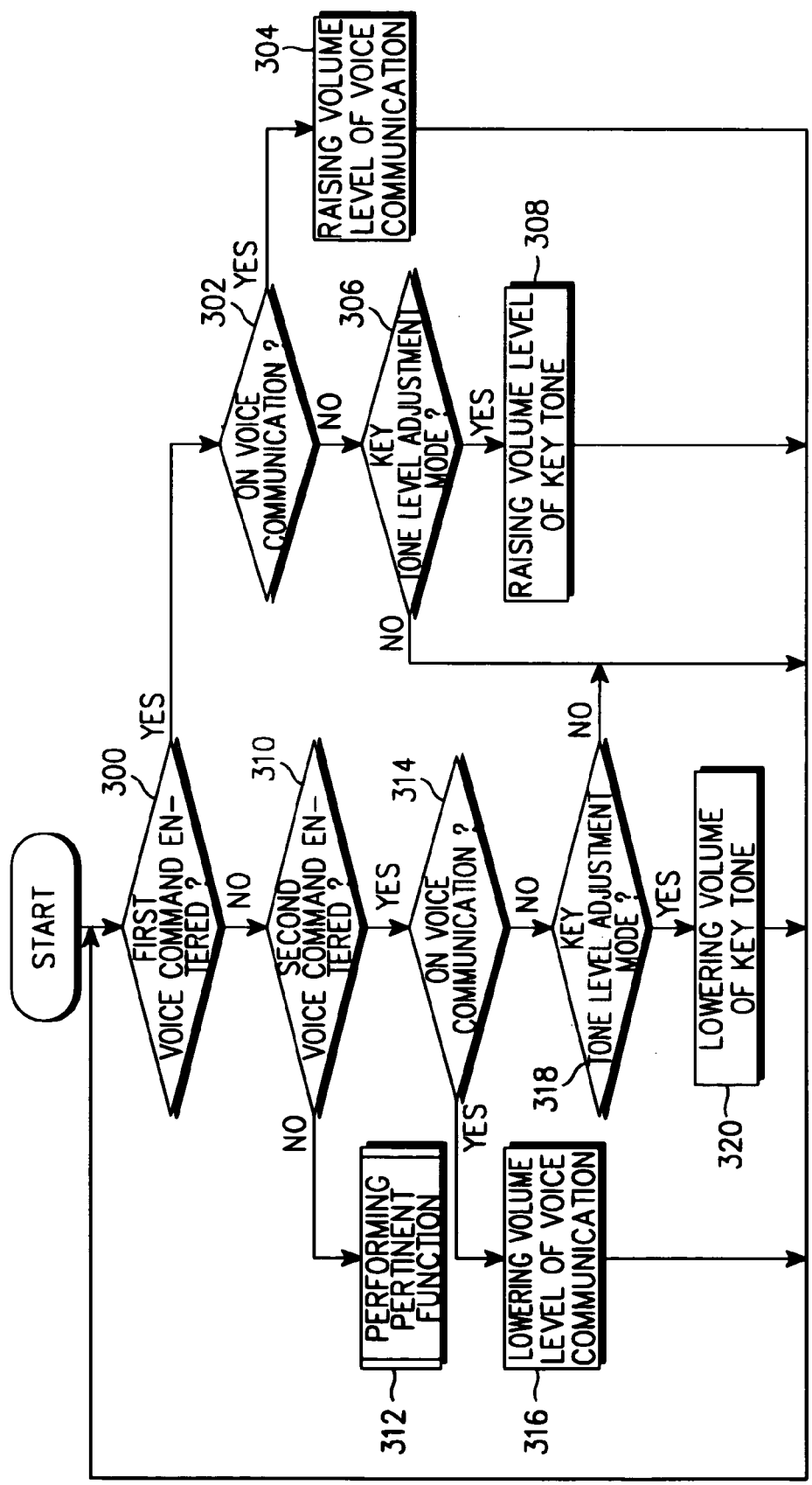
FIG. 3 is a flow chart illustrating the process of adjusting the volume level of voice communication and key tone in a cellular phone according to the present invention.

Referring to FIG. 3, the process of adjusting the volume level of voice communication and key tone by using the first and second voice commands is described. The control unit 106 determines at decision 300 whether the first voice command for raising the volume level is entered. The control unit 106 determines at decision 302 whether the cellular phone is in an "on" state for voice communication. If so, control unit 106 proceeds to step 304 to raise the volume level by one degree. If not, the control unit 106 determines at step 306 whether the user has entered the key tone level adjustment mode by operating the keypad 112. If the user did enter the key tone level adjustment mode, the control unit 106 proceeds to step 308 to raise the volume level of the key tone by one degree. A degree of adjustment refers to either increasing or decreasing the volume level by 3 decibels.

Alternatively, if the first voice command is not entered in step 300, the control unit 106 determines at decision 310 whether the second voice command for lowering the volume level is entered. If so, control unit 106 determines at decision 314 whether the cellular phone is in the "on" state for voice communication. If not, control unit 106 proceeds to step 312 to perform pertinent functions. The pertinent functions refer to manually adjusting the volume of communication voice and key tone of the cellular phone by using the key pad. If it is determined in step 314 that the system is in an "on" state for receiving voice communication, the control unit 106 proceeds to step 316 to lower the volume level by one degree. If not in an "on" state, the control unit 106 determines at step 318 whether the user has entered the key tone level adjustment mode by operating the keypad 112. If the key tone level adjustment mode is entered, the control unit proceeds to step 320 to lower the volume level of the key tone by one degree.

Thus, the invention provides the cellular phone with means to adjust the volume level using voice commands so that the conventional volume level adjustment buttons are not required. While the present invention has been described in connection with specific embodiments accompanied by the attached drawings, it will be readily apparent to those skilled in the art that various changes and modifications may be made thereto without departing from the spirit and scope of the present invention.

What is claimed is:

1. A method for adjusting a volume level of key tone in a cellular phone, comprising the steps of:
   registering by a user a first voice command for commanding the cellular phone to raise the key tone volume level;
   registering by the user a second voice command for commanding the cellular phone to lower the key tone volume level; and
   raising or lowering the key tone volume level respectively in response to said first or said second voice command inputted to said cellular phone.

2. A method for adjusting a volume level of communication voice and key tones in a communication mode and a standby mode of a cellular phone, comprising the steps of:
   registering by a user a first voice command for commanding said cellular phone to raise the volume level;
   registering by the user a second voice command for commanding the cellular phone to lower the volume level;
   determining whether the cellular phone is in an "on" state for receiving communication when said first or said second voice command is inputted to said cellular phone;
   raising or lowering the volume level respectively in response to said first or said second voice command if said cellular phone is in said "on" state;
   determining whether said cellular phone is in a key tone adjustment mode if said cellular phone is not in said "on" communication state when said first or said second voice command is inputted to said cellular phone; and
   raising or lowering the volume level of the key tones, respectively, in response to said first or said second voice command if said cellular phone is in said key tone adjustment mode.

* * * * *